US011990305B2

(12) United States Patent
Shi et al.

(10) Patent No.: US 11,990,305 B2
(45) **Date of Patent: *May 21, 2024**

(54) FUSE IN FORM OF BREAKING FUSANT BY FUSING BREAKING AND MECHANICAL BREAKING

(71) Applicant: XI' AN SINOFUSE ELECTRIC CO., LTD., Shaanxi (CN)

(72) Inventors: Xiaoguang Shi, Shaanxi (CN); Rongrong Chen, Shaanxi (CN); Wei Wang, Shaanxi (CN)

(73) Assignee: XI' AN SINOFUSE ELECTRIC CO., LTD., Shaanxi (CN)

( * ) Notice: Subject to any disclaimer, the term of this patent is extended or adjusted under 35 U.S.C. 154(b) by 290 days.

This patent is subject to a terminal disclaimer.

(21) Appl. No.: 17/618,391

(22) PCT Filed: Aug. 23, 2021

(86) PCT No.: PCT/CN2021/114092
§ 371 (c)(1),
(2) Date: Dec. 10, 2021

(87) PCT Pub. No.: WO2022/121373
PCT Pub. Date: Jun. 16, 2022

(65) Prior Publication Data

US 2023/0154714 A1 May 18, 2023

(30) Foreign Application Priority Data

Dec. 11, 2020 (CN) ......................... 202011461082.1
Jun. 24, 2021 (CN) ......................... 202110703115.7

(51) Int. Cl.
*H01H 85/055* (2006.01)
*H01H 85/165* (2006.01)
*H01H 85/38* (2006.01)

(52) U.S. Cl.
CPC ........ *H01H 85/055* (2013.01); *H01H 85/165* (2013.01); *H01H 85/38* (2013.01)

(58) Field of Classification Search
CPC .... H01H 85/055; H01H 85/165; H01H 85/38; H01H 85/08; H01H 85/10; H01H 85/18;
(Continued)

(56) References Cited

U.S. PATENT DOCUMENTS 3,301,978 A * 1/1967 Fister ................. H01H 85/0456 337/254
3,778,740 A * 12/1973 Gaia .................... H01H 85/205 337/265

(Continued)

FOREIGN PATENT DOCUMENTS

CN 106030746 A 10/2016
CN 207690743 U 8/2018

(Continued)

OTHER PUBLICATIONS

Lell Peter, "Disconnecting Switch for High Direct or Alternating Currents at High Voltages", Feb. 2, 2017, Entire Document (Translation of WO 2017016543) (WIPO version of DE 102015112141). (Year: 2017).*

(Continued)

*Primary Examiner* — Stephen S Sul
(74) *Attorney, Agent, or Firm* — IP & T GROUP LLP

(57) ABSTRACT

A fuse in form of breaking fusant by fusing breaking and mechanical breaking includes hollow shell; arc extinguishing medium filled in the shell; at least one piece of fusant arranged in the shell; and conductive terminals provided as penetrating through shell wall and capable to be connected to external circuit, two ends of the fusant are respectively connected with the conductive terminals, at least one breaking device that mechanically breaks the fusant is provided in (Continued)

the shell; driving device arranged outside the shell, after receiving external excitation signal, drives the breaking device to break the fusant in one of linear and rotational displacement modes or their combination; blocking structures are arranged between the breaking device and the shell wall; and the fusant located in the arc extinguishing medium is provided with weak positions where mechanical breaking strength of the fusant is reduced and fusing is easy to be achieved.

20 Claims, 4 Drawing Sheets

(58) Field of Classification Search
CPC .. H01H 3/24; H01H 3/26; H01H 3/28; H01H 85/12; H01H 39/006; H01H 9/10; H01H 85/02; H01H 85/175; H01H 2085/388; H01H 85/0039
See application file for complete search history.

(56) References Cited

U.S. PATENT DOCUMENTS

| | | | | |
|---|---|---|---|---|
| 4,636,765 | A | 1/1987 | Krueger | |
| 11,127,555 | B1 * | 9/2021 | Ide | H01H 85/1755 |
| 2014/0061161 | A1 * | 3/2014 | Nakamura | H01H 33/06 218/46 |
| 2017/0076890 | A1 * | 3/2017 | Hori | B60L 3/0007 |
| 2019/0371561 | A1 * | 12/2019 | Ehrhardt | H01H 39/006 |
| 2020/0211804 | A1 * | 7/2020 | Wang | H02H 3/05 |
| 2020/0321181 | A1 * | 10/2020 | Mathieu | H01H 39/004 |
| 2021/0183607 | A1 * | 6/2021 | Schlaak | H01H 89/00 |
| 2022/0246377 | A1 * | 8/2022 | Gerlaud | H01H 9/106 |
| 2023/0154713 | A1 * | 5/2023 | Ge | H01H 85/05 337/187 |

FOREIGN PATENT DOCUMENTS

| | | | | |
|---|---|---|---|---|
| CN | 110494946 | A | 11/2019 | |
| CN | 111341627 | A | 6/2020 | |
| CN | 113223905 | A | 8/2021 | |
| CN | 214411110 | U | 10/2021 | |
| DE | 102015112141 | A1 | 1/2017 | |
| DE | 102018100686 | A1 | 3/2018 | |
| FR | 3017240 | A1 | 8/2015 | |
| FR | 3081255 | A1 | 11/2019 | |
| GB | 2576728 | A | 3/2020 | |
| JP | 2019212612 | A | 12/2019 | |
| WO | 2017016543 | A1 | 2/2017 | |
| WO | WO-2017016543 | A1 * | 2/2017 | H01H 39/006 |
| WO | 2019224469 | A1 | 11/2019 | |
| WO | 2020043616 | A1 | 3/2020 | |
| WO | 2020064567 | A1 | 4/2020 | |

OTHER PUBLICATIONS

Decision to grant a patent for the Japanese Patent Application No. 2021-570384 issued by the Japanese Patent Office on Aug. 30, 2023.
European Search Report for the European Patent Application No. 21791234.4 issued by the European Patent Office on Nov. 7, 2022.
International Search Report and Written Opinion for the PCT Application No. PCT/CN2021/114092 by the International Searching Authority on Oct. 20, 2021.
Notification to Grant Patent Right for Invention of priority application CN202110703115.7 issued by the Chinese Patent Office on Dec. 26, 2023.
Office Action for the European Patent Application No. 21791234.4 issued by the European Patent Office on Dec. 2, 2022.
Office Action for the Japanese Patent Application No. 2021-570384 issued by the Japanese Patent Office on Mar. 9, 2023.
Office Action for the Korean Patent Application No. 10-2022-7009836 issued by the Korean Intellectual Property Office on Dec. 26, 2023.
Office Action for the Chinese Patent Application No. 202110703115.7 issued by the Chinese Patent Office on Jun. 28, 2023.
Office Action for the Japanese Patent Application No. 2021-570384 issued by the Japanese Patent Office on Jul. 25, 2023.

* cited by examiner

FUSE IN FORM OF BREAKING FUSANT BY FUSING BREAKING AND MECHANICAL BREAKING

CROSS-REFERENCES TO RELATED APPLICATIONS

This application is a National Phase application of PCT application no. PCT/CN2021/114092 filed on Aug. 23, 2021, which claims priorities of Chinese patent application filed with the Chinese Patent Office, on Dec. 11, 2020, with an application number of 202011461082.1, entitled "Fuse in Form of Breaking Fusant by Fusing Breaking and Mechanical Breaking", and Chinese patent application filed with the Chinese Patent Office, on Jun. 24, 2021, with the application number of 202110703115.7, entitled "Fuse in Form of Breaking Fusant by Fusing Breaking and Mechanical Breaking", the entire content of which is incorporated into the present disclosure by reference.

TECHNICAL FIELD

The present disclosure discloses a new type of fuse in which a circuit can be broken by the fusing breaking of current or the mechanical force. As a circuit protection and fault control device, it can be applied to the equipment, such as power generation, power transmission, power distribution, and electricity consumption equipment, as well as to the fields, such as, electric vehicles, ships, aviation and the like.

BACKGROUND ART

The traditional fuse uses the heat generated by the flowing current to perform the fusing. The main problem is that current heating is the energy source for the fuse action, wherein when the overcurrent is small, it would take a lot of time to accumulate the heat and thus the fusing time is relatively long, such that the back-end devices cannot be reliably protected. In addition, when there appear the situations, such as, a part of the conductor coil has the short circuit between the turns, the internal resistance of the power supply is large or the output current capacity is small, or the electrical equipment is immersed in water that may cause a short circuit, the overcurrent is less than a certain value and not large, but it still needs to make the circuit cut off. At this time, the traditional fuse cannot works in time and cannot reliably protect the electrical appliances. If a switch is used to cut off the circuit when being in the similar situation of small currents, the switch device is needed to be added. Since the maximum breaking current capacity of the switch is weaker than that of the fuse, it is necessary to distinguish the value of overcurrent and determine whether the switch is suitable for breaking action, which may cause the breaking situation to become unsafe. Generally speaking, switches have disadvantages, such as large size and high cost. Especially for direct-current (DC) overcurrent faults, since DC has no zero-crossing point, the general air switch cannot use the principle of arc extinguishing at zero-crossing point, and the breaking capacity is greatly reduced. However, the fuse has the strong ability to break DC overcurrent, the small size, the low cost, which is safe and reliable.

The main reason for the fuse having high breaking capacity is that the arc extinguishing medium filled has the ability to extinguish arc, which is much stronger than that of the gas or vacuum medium of the switch.

At present, there are structures in which the fuse is provided therein with a spring or the fusant fracture is elongated by gravity. After the fusant is fused, the fusant is forced and moved to elongate the fracture to improve the breaking capacity, which however has the following problems: 1. the external control cannot be carried out, and the mechanical force will only play a role after the current fusing; 2. it cannot be guaranteed to have multiple fractures in series and the reliability of the elongation, and however the multiple fractures in series are important for breaking at the higher voltages and larger overcurrent value. Therefore, it can only be used on the fuses with small rated current, low rated voltage, low breaking capacity, or large volume and movement space.

SUMMARY

The technical problem to be solved by the present disclosure is to provide a fuse of breaking a fusant by current fusing breaking and mechanical force. Through one mode of breaking a fusant by fusing breaking and mechanical force or combination of both, the breaking capacity, arc extinguishing capacity and reliability of the fuse are improved.

In order to solve the above-mentioned technical problems, the technical solution provided by the present disclosure discloses a fuse in form of breaking a fusant by fusing breaking and mechanical breaking, comprising a hollow shell; an arc extinguishing medium, which is filled in the shell; at least one piece of fusant, which is arranged in the shell, and conductive terminals, which are provided as penetrating through a shell wall of the shell, with conductive terminals capable to be connected to an external circuit, wherein two ends of the fusant are respectively connected with conductive terminals, wherein at least one breaking device that mechanically breaks the fusant is provided in the shell; a driving device arranged outside the shell, after receiving an external excitation signal, drives the breaking device to break the fusant in one of a linear displacement mode and a rotational displacement mode or a combination of both mode, so that the fusant is formed with at least one fracture in the arc extinguishing medium; a blocking structure for preventing the arc extinguishing medium from leakage is arranged between the breaking device and the shell wall; and the fusant which is located in the arc extinguishing medium is provided with at least one weak positions where a mechanical breaking strength of the fusant is reduced and a fusing is easy to be achieved.

Optionally, as for the breaking device that breaks the fusant in a manner of linear movement, and the breaking device comprises at least one force applying member and at least one guiding member arranged on both sides of the fusant, respectively; one end of the force applying member penetrates out the shell wall; one end of the guiding member is provided as penetrating the shell wall, wherein when the one end of the guiding member is located in the shell wall, a gap is formed between the one end of the guiding member and the shell wall, allowing for displacement of the guiding member; a blocking structure for preventing the arc extinguishing medium from leakage is provided between the force applying member, the guiding member and the shell wall; and the driving device drives the force applying member and the guiding member to displace and break the fusant to form a fracture.

Optionally, the arc extinguishing medium is of arc extinguishing solid particles, arc extinguishing liquid, or arc extinguishing colloid with or without particles, wherein the force applying member and the guiding member, in combination, clamp the fusant, and no gap or a tiny gap exists between the force applying member and the fusant and between the guiding member and the fusant, with the tiny gap not allowing the arc extinguishing medium to pass therethrough, wherein when the force applying member drives the fusant to move, sum of volume of a part of the force applying member and volume of a part of the guiding member, inside the shell, does not change significantly.

Optionally, when the driving device is working, the force applying member drives the fusant to move in the arc extinguishing medium, so that the fusant is gradually stretched and formed with a fracture at the weak position, and an arc channel is formed between fusants on both sides after breaking, and the fusant on at least one side and at least a part of a path of the arc channel are in the arc extinguishing medium.

Optionally, both sides of the fusant after breaking are a cathode and an anode, respectively, and the cathode or the anode can be driven by the force applying member to move into an insulating slit between the force applying member and the shell.

Optionally, the breaking device for breaking the fusant in a linear displacement manner (mode) comprises at least one set of force applying members, wherein the force applying member has one end extending out of the shell and the other end located on one or both sides of the fusant in the arc extinguishing medium; a blocking structure for preventing the arc extinguishing medium from leakage is arranged between the force applying device and the shell wall; the driving device drives the force applying member to pull or push the fusant to make it broken, forming a fracture, wherein when the driving device is working, the force applying member drives the fusant to move in the arc extinguishing medium, so that the fusant is stretched and the fracture is formed at a position of the fusant where mechanical strength is weak or at a position of the fusant material where tensile stress is concentrated, and after breaking, both sides of the fusant are a cathode and an anode, respective, an arc path is formed between the cathode and the anode, the cathode and/or the anode are still in the arc extinguishing medium, and part or all of the arc path is in the arc extinguishing medium.

Optionally, with a position of the fusant close to the force applying member as a reference point, a preset distance is provided between the weak position and the shell, and/or between the weak position and the reference point; and due to the preset distance, a distance is formed between the fracture and the shell and/or the force applying member, and the fusant is broken to form two ends, with at least one of the two ends capable of being wrapped by the arc extinguishing medium, and no air space larger than the preset range exists around the fracture.

Optionally, the preset distance exists between the weak position and the reference point; and the fusant after being broken forms two parts which are a first segment and a second segment, respectively, and a part of the second segment can be finally squeezed into a slit between the force applying member and a supporting structure in the shell.

Optionally, the preset distance exists between the weak position and the reference point; and the fusant after being broken forms two parts which are a first segment and a second segment, respectively, and the second segment can move such that the second segment and the first segment are located on both sides of the force applying member, respectively.

Optionally, a width of the force applying member is not less than a cross-sectional width of the first segment or a cross-sectional width of the second segment after the breaking; and after the first segment and the second segment are respectively located on both sides of the force applying member, the force applying member forms an insulation wall between the first segment and the second segment.

Optionally, a part of the force applying member that is in contact with the shell or the force applying member itself is made of a gas generating material which can generate arc extinguishing gas after arc burning.

Optionally, the breaking device for breaking the fusant in a linear displacement manner comprises at least one set of force applying members; the force applying member is located outside the shell, and a part of the fusant located in the shell is wound to extend out of the shell to form a U-shaped or arc-shaped structure outside of the shell; the force applying member is provided as penetrating in the arc structure; a blocking structure for preventing the arc extinguishing medium from leakage is provided between the fusant and the shell wall; and when the driving device drives the force applying member to break the fusant to form a fracture, the fracture is located in the arc extinguishing medium.

Optionally, the breaking device for breaking the fusant in a rotational displacement manner (mode) comprises a rotational force applying member which is rotatably penetratingly installed on the shell, or a partial structure of the shell can rotate and serve as a rotational force applying member of the breaking device; the rotational force applying member is partly located outside the shell and partly located in the arc extinguishing medium; the fusant is provided as penetrating and is fixed on the rotational force applying member located in the arc extinguishing medium; a blocking structure for preventing the arc extinguishing medium from leakage is provided between the rotational force applying member and the shell wall; and a driving device drives the rotational force applying member to break the fusant in a rotational displacement manner to form a fracture.

Optionally, at least one set of the force applying member and the guiding member are provided on both sides of the fusant; and one ends of the force applying member and/or the guiding member located on both sides of the fusant are fixedly connected to the fusant and clamp the fusant.

Optionally, when the guiding member is provided as penetrating in a through hole on the shell wall, a displacement distance limiting structure is provided in a direction in which the guiding member is displaced and moves forward.

Optionally, one end of the rotational force applying member located in the arc extinguishing medium, which is in shape of a clip, clamps the fusant.

Optionally, the driving device is a gas generating device that can generate pressurized gas, a fluid generating device that generates pressurized fluid, electric motor, air cylinder, hydraulic cylinder, pneumatic motor, hydraulic motor, or transmission device.

Optionally, the fusant which is located in the arc extinguishing medium is provided with at least one weak positions where a mechanical breaking strength of the fusant is reduced and a fusing is easy to be achieved.

Optionally, at least one breaking device for breaking the fusant in a rotational displacement manner is further provided in a shell on one side of the breaking device that breaks the fusant in a linear displacement manner; the at least one breaking device for breaking the fusant in a rotational displacement manner comprises a rotational force applying member which is rotatably penetratingly installed on the shell, and the rotational force applying member is partly located outside the shell and partly located in the arc extinguishing medium; the fusant penetrates and is fixed on the rotational force applying member located in the arc extinguishing medium; a blocking structure for preventing the arc extinguishing medium from leakage is arranged between the rotational force applying member and the shell wall; and the driving device drives the rotational force applying member to break the fusant in a rotational displacement manner to form a fracture.

Optionally, a supporting and fixing device for supporting and fixing the fusant is provided in the shell.

The fuse of the present disclosure can be used in power distribution units, various equipment, instruments, and vehicles, such as new energy vehicles, and other circuits that require using a fuse.

BRIEF DESCRIPTION OF DRAWINGS

In order to explain the technical solutions of the embodiments of the present disclosure more clearly, the drawings that need to be used in the embodiments will be briefly introduced as follow. It should be understood that the following drawings only show certain embodiments of the present disclosure, and therefore should not be regarded as a limitation on the protection scope. For those of ordinary skill in the art, without creative work, other related drawings can be obtained from these drawings.

DETAILED DESCRIPTION OF EMBODIMENTS

Figure 1:
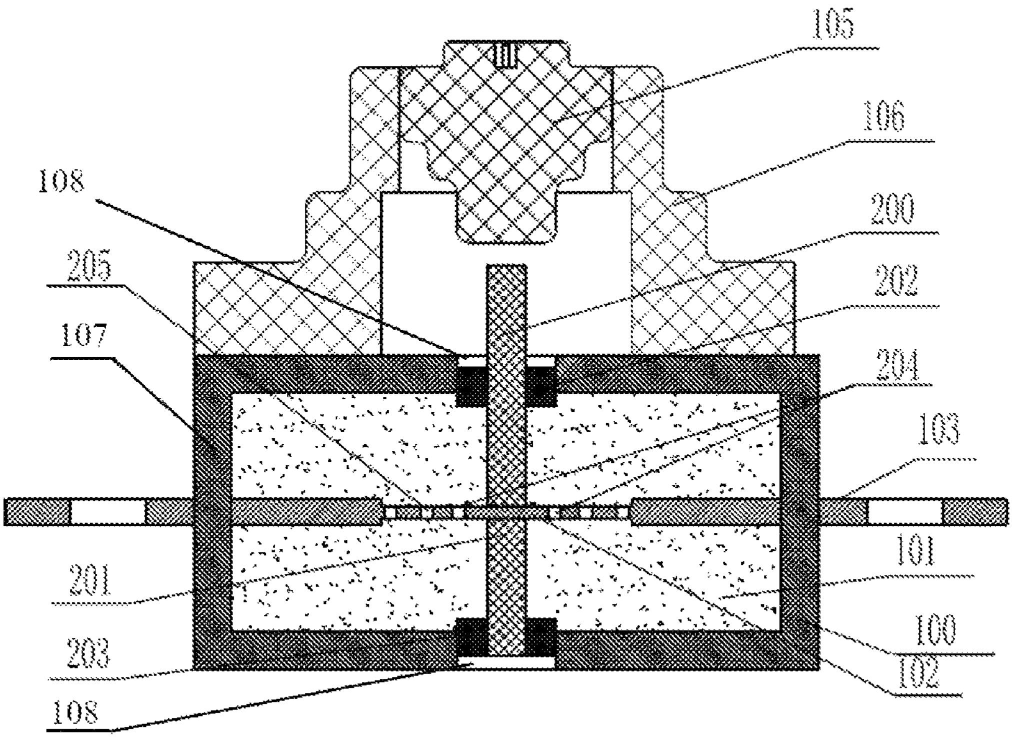
FIG. 1 is a schematic structural diagram for breaking the fusant in a linear displacement manner.

In order to make the objectives, technical solutions and advantages of the embodiments of the present disclosure clearer, the technical solutions in the embodiments of the present disclosure will be described clearly and completely in conjunction with the drawings in the embodiments of the present disclosure. Obviously, the described embodiments are part of the content of this disclosure, but not the entire content. Generally, the components of the embodiments of the present disclosure described and illustrated in the drawings herein may be arranged and designed in various different configurations.

Therefore, the following detailed description of the embodiments of the present disclosure provided in the drawings is not intended to limit the scope of the claimed present disclosure, but merely represents part of the content of the present disclosure. Based on the embodiments in the present disclosure, all other embodiments obtained by those ordinarily skilled in the art without creative work, shall fall within the protection scope of the present disclosure.

It should be noted that similar reference numerals and letters indicate similar items in the following drawings. Therefore, once a certain item is defined in one drawing, it is not needed to be further defined and explained in the subsequent drawings.

In the description of the present disclosure, it should be noted that the orientation or positional relationship indicated by the terms "inner", "outer", etc. are based on the orientation or positional relationship shown in the drawings, or the orientation or positional relationship in which the product is usually placed in use. It is only for the convenience of describing the present disclosure and simplifying the description, rather than indicating or implying that the mentioned device or element must be in a specific orientation, or constructed or operated in a specific orientation, and therefore it cannot be understood as a limitation to the present disclosure. In addition, the terms "first", "second", etc. are only used for distinguishing purpose in the description, and cannot be understood as indicating or implying the relative importance.

In the description of the present disclosure, it should also be noted that, unless clearly defined and limited otherwise, the terms "provide" and "connection" should be understood in a broad sense, for example, it may be a fixed connection or a detachable connection, or integrally connected; it can be a mechanical connection or an electrical connection; it can be directly connected, or indirectly connected through an intermediate medium, and it can be the internal communication between two components. For those ordinarily skilled in the art, the specific meanings of the above-mentioned terms in the present disclosure can be understood in specific situations.

Embodiments

With regard to the above technical solutions, detailed descriptions are given by means of embodiments, in conjunction with the drawings. The fuse of the present disclosure mainly comprises a shell, a fusant, a driving device, and a breaking device.

Herein, as shown in FIG. 1, the shell 100 is in a hollow sealing structure, and arc extinguishing medium 101 is filled in the shell 100. The arc extinguishing medium 101 is the arc extinguishing medium in the state of granular solid, gel, liquid, etc. Usually, the quartz sand which is densely filled is used. The fusant 102 is arranged in the arc extinguishing medium 101 in the shell 100, and two ends of the fusant 102 are respectively connected to the conductive terminals 103 passing through the shell wall 107. The contact surface between the conductive terminal 103 and the shell 100 is in sealed contact to prevent the arc extinguishing medium 101 from overflowing.

The driving device 105 is located outside the shell 100 and provides the driving force for the breaking device. The driving device 105 may be a gas generating device that can generate pressurized gas, a fluid generating device that generates pressurized fluid, an electromagnetic driving device 105, an electric motor, an air cylinder, a hydraulic cylinder, a pneumatic motor, a hydraulic motor, or a transmission device. The driving device 105 provides, for the breaking device, a linear displacement driving force, a rotational displacement driving force, or a driving force of linear displacement and rotational displacement combined. When the driving device 105 is a gas generating device, the driving device 105 and the breaking device part, which is located outside the shell 100, need to be hermetically arranged outside the shell 100, so as to ensure that the generated high-pressure gas will not escape. In FIG. 1, the driving device 105 is a gas generating device. Therefore, a sealed cover 106 is provided on the outer periphery of the breaking device and the driving device 105 outside the shell 100.

The breaking device is configured to mechanically break the fusant 102 located in the arc extinguishing medium 101. The breaking device can break the fusant 102 by linear displacement manner, or break the fusant 102 by rotational displacement manner.

The structure shown in FIG. 1 is a structure in which the fusant 102 is broken in a linear displacement manner. The breaking device comprises a force applying member 200 and a guiding member 201 arranged on the upper and lower sides of the fusant 102 in the shell 100, both of which are in rod-shaped structure. In FIG. 1, the one ends of the force applying member 200 and the guiding member 201, at the two sides of the fusant 102, are fixedly connected together, so that the force applying member 200, the guiding member 201 and a part of the fusant 102 sandwiched therebetween form a combination body. The force applying member 200, located above the fusant 102, penetrates upward and protrudes from the shell wall 107. A blocking structure for preventing the arc extinguishing medium 101 from leakage is provided at the contact surface between the force applying member and the shell wall 107. In the embodiment, the blocking structure between the force applying member 200 and the guiding member 201 and the shell wall 107 is a sealing member, and the sealing member is a sealing ring 202 and 203. The blocking structure can also be realized by means of interference fit, or other mechanical structural.

A through hole 108 allowing the force applying member 200 to pass through is formed on the shell wall corresponding to the lower end of the guiding member 201. The lower end of the guiding member 201 penetrates through the through hole 108, and a blocking structure for preventing the arc extinguishing medium 101 from leakage is provided at the contacting surface between the lower end of the guiding member 201 and the shell wall 107. When the driving device 105 receives an external excitation signal to act, the force applying member 200, the guiding member 201 and the part of the fusant 102 clamped therein are driven to be displaced together, so that the fusant 102 is broken. Since the through hole 108 is provided, the one end of the guiding member 201, which is located in the through hole 108, is displaced to its final position, which may be inside the through hole 108 or outside the shell 100.

When the through hole 108 that is communicated to the outside of the shell 100 is not provided on the shell wall 107, a gap sufficient for the guiding member 201 to move must exist between the end portion of the guiding member 201 and the bottom of the hole in the shell wall 107 where the guiding member is located. When the guiding member 201 is displaced under the action of the force applying member 200, the guiding member 201 will not protrude out of the shell 100.

In FIG. 1, a gas generating device is used as the driving device 105. The gas generating device receives an excitation signal from the outside, which is generally an electrical signal, ignites to generate a large amount of high-pressure gas, and pushes the force applying member 200 and the guiding member 201 to move together.

In the length direction of the fusant 102 located on two sides of the force applying member 200 and the guiding member 201, weak positions 204 are respectively provided. The weak positions 204 are provided for the purpose of reducing the breaking strength of the breaking points of the fusant 102, such that it is easier to break when subjected to an impact. In FIG. 1, the weak positions 204 are several through holes formed on the fusant 102 at intervals. The weak position 204 can also be a disconnection groove penetrating the fusant 102 in the width direction of the fusant 102, which can be set at the corresponding position on one or both sides of the fusant 102. The shape of the disconnection groove can be a single structure, such as V-shaped, U-shaped, and wavy, or the structure composed of several structures. It may also be one row or several rows of through holes arranged spaced apart in the width direction of the fusant 102 to reduce the strength of the weak positions 204. It can be a structure that concentrates stress, such as a variable cross-section structure, in which the section of the fusant 102 at the breaking point is gradually narrowed. When being impacted by an external force, the impact strength per unit area can be increased. It is also possible to use a conductive material with lower strength to replace the original material of the fusant 102 at the weak positions 204, for producing the weak positions 204.

The fusant 102 may be fixed in the method of pressing both ends thereof tightly, and then force is applied in the middle position, so that the fusant 102 is broken; and alternatively it is possible to fix the one end, and then the fusant 102 is formed as U- or Z-shaped profile in the arc extinguishing medium 101, and then the other free end is stretched, so that it is broken at the weak positions 204 between the profile and the force applying point. It may also be a columnar structure with the shell 100 protruding inward, which passes through the fusant 102 and weak positions 204 are designed to be near the column, so that when force is applied to one or both sides of the column, it is easily broken at the weak positions 204.

A fusing weak position 205 is provided on the fusant 102. A plurality of fusing weak positions 205 may be provided on the fusant 102 at intervals. In FIG. 1, the fusing weak position 205 is of a narrow long shape. The fusing weak position 205 can also be a variable cross-sectional structure. Alternatively, low-temperature fusing conductive material is provided at the fusing weak position 205, or low-temperature fusing material is provided on the surface of the fusant 102. The low-temperature fusing conductive material can be fused at a lower temperature, and can accelerate the fusing of the fusant 102. Alternatively, a metallurgical effect point is provided on the fusant 102, or conductive material with low conductivity is used. The position where the fusing weak position 205 is set on the fusant 102 does not affect the breaking device to break the fusant 102.

The fusant 102 in the cavity of the shell 100 can be arranged in a linear flat plane shape, or can be arranged in a trapezoidal bent shape. When the fusant 102 in the shell 100 is arranged in a trapezoidal structure, the weak position 204 is arranged on one trapezoidal side connected to the part of the fusant 102 between the force applying member 200 and the guiding member 201. When the fusant 102 is provided in a trapezoidal structure in the cavity of the shell 100, due to the suppression of the arc extinguishing medium 101, when the force applying member 200 and/or the guiding member 201 drives the part of the fusant 102 in which the part is clamped or fixed thereto to move downwards together, it is easier to break the fusant 102.

Figure 2:
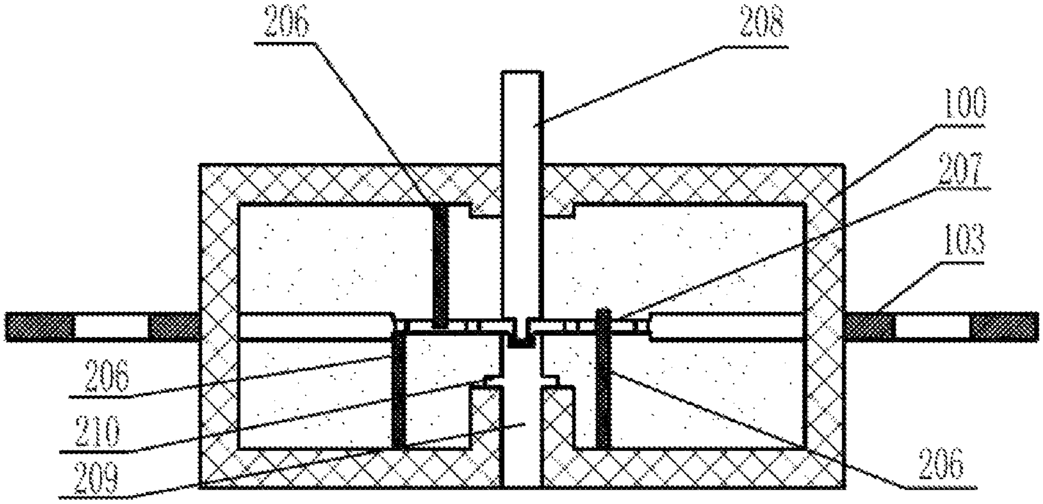
FIG. 2 is a schematic structural diagram for breaking the fusant in a linear displacement manner, which has a supporting and fixing device.

Referring to FIG. 2, a supporting and fixing device 206 is also provided between the fusant 207 and the shell 100. The supporting and fixing device 206 is located on one or both sides of the breaking device. It can be provided on one or both sides of the fusant 207. The structure of the supporting and fixing device 206 may be a supporting boss structure, a supporting cantilever structure, a supporting rod-shaped structure, etc., configured as a structure for supporting and fixing the fusant 207. One end of the supporting and fixing device is fixedly arranged on the shell 100, and the other end thereof is in contact with and fixed to the fusant 207. By the supporting and fixing device 206, the length of the fusant 207 between the breaking device and the supporting and fixing device 206 is shortened, which helps the fusant 207 to be quickly broken. In FIG. 2, a groove structure is provided at the breaking position of the fusant 207, and one end of the force applying member 208 located in the arc extinguishing medium is embedded and snapped in the groove of the fusant 207. A boss is provided on the inner wall of the shell 100 on the side where the guiding member 209 is located. A through hole 108 is formed on the boss and the wall of the shell 100, and a limiting rib 210 is provided on the outer periphery of the guiding member 209. When one end of the guiding member 209 is provided as penetrating the through hole 108, the limiting rib 210 is precisely snapped on the boss to limit the position of the guiding member 209, and at the same time, prevent the arc extinguishing medium from leakage. The other end of the guiding member 209 supports the fusant 207. When the driving device (not shown) drives the force applying member 208 and the guiding member 209 to be displaced in a linear manner, the limiting rib 210 on the guiding member 209 is broken under the action of the driving force, and the position limitation of the guiding member 209 is released.

Figure 3:
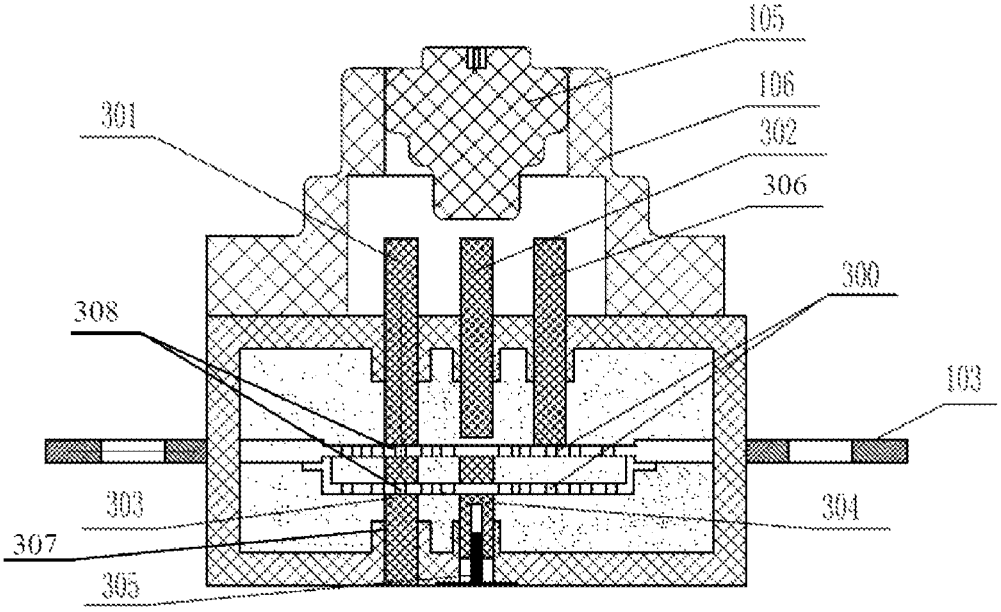
FIG. 3 is a schematic structural diagram of multiple sets of breaking devices for breaking the fusant in a linear displacement manner.

FIG. 3 shows another structure for breaking the fusant 300 in a linear displacement manner. Two fusants 300 are arranged in parallel in the shell 100, and two ends of the fusant 300 are respectively connected to the conductive terminals 103. Three force applying members 301, 302, 306 are arranged at intervals on one sides of the two fusants 300, wherein one ends of the force applying members 301, 306 are in contact with the fusant 300, and a gap is left between one end of the force applying member 302 and the fusant 300. The size of the gap satisfies that the arc extinguishing medium filled therein will not prevent the force applying member 302 from applying force to the fusant 300 and the guiding member 304. A guiding member 303 and a guiding member 304 respectively corresponding to the force applying member 301 and the force applying member 302 are provided on the other sides of the two fusants 300.

Herein, the arc extinguishing medium is of arc extinguishing solid particles, arc extinguishing liquid or arc extinguishing colloid with or without particles. When the force applying member and the guiding member together clamp the fusant 300 (e.g., the force applying member 302 and the guiding member 304 together clamp the fusant 300), no gap or a small gap that the arc extinguishing medium cannot pass through exists between the force applying member and the fusant 300, or between the guiding member and the fusant 300. When the force applying member drives the fusant 300 to move, the volume sum of parts of the force applying member and the guiding member inside the shell 100 is generally unchanged.

It should be noted that "the volume sum of parts of the force applying member and the guiding member inside the shell 100 is generally unchanged significantly" means that the volume sum of the parts of the force applying member and the guiding member inside the shell 100 may be completely unchanged. It does not change along with the movement of the both, and alternatively it can also be slightly increased or slightly decreased. The slight increase here means that the force applying member and the guiding member can be small-angle tapered members, which does not significantly increase the resistance between it and the arc extinguishing medium during movement, does not affect the reliable implementation of the breaking action, can also compensate for loss of the arc extinguishing medium under the arc burning, and compact the arc extinguishing medium and improve the arc extinguishing ability. The volume reduction helps to reduce the resistance, while the proportion of volume reduction cannot affect the arc extinguishing ability of the arc extinguishing medium. In short, the volume may be slightly increased as long as it does not block the movement of the breaking device, and the volume may be slightly decreased as long as it does not affect the filling degree of the arc extinguishing medium.

In detail, the guiding member 303 and the guiding member 304 are located at one end of the fusant 300 and are respectively provided with hole slots allowing the fusants 300 to pass through, wherein one fusant 300 contacts the end portion of the guiding member, and the other fusant 300 passes through the hole slot on the guiding member. Through holes 108 are respectively formed on the shell wall of the shell 100 corresponding to one ends the guiding member 303 and 304. The other end of the guiding member 303 is provided as penetrating the through hole 108. A limit pin 305 is provided outside the through hole 108 corresponding to the guiding member 304. The limit pin 305 is of a convex structure. The bottom of the limit pin 305 is provided on the outer side wall of the shell 100. The pin rod portion of the limit pin 305 is located in the through hole 108. A groove with a certain depth is formed at the end portion of the guiding member 304 corresponding to the limit pin 305, and the pin rod portion of the limit pin 305 located in the through hole 108 is inserted into the groove at the end portion of the guiding member 304. There is a displacement gap between it and the bottom of the groove, and there is a displacement gap between the end portion of the guiding member 304 and the bottom of the limit pin 305. A limit pin 305 is provided to limit the displacement distance of the force applying member and the guiding member.

In FIG. 3, three force applying members 301, 302, and 306 share one driving device 105, which is a gas generating device. The gas generating device receives an excitation signal from the outside to act, so as to release a large amount of high-pressure gas, and the three force applying members 301, 302, 306 are all displaced under the drive of the high-pressure gas, wherein the force applying member 301 and the force applying member 302 push the fusant 300 and the guiding members 303 and 304 to displace and break the fusant 300, and the force applying member 306 breaks the fusant 300 located in the direction in which the force applying member is displaced. A number of mechanically broken fractures are formed on the fusant 300.

In the above arc extinguishing process, the movement of the force applying members 301, 302, 306 and the guiding members 303, 304 can ensure that the arc extinguishing medium is in the state of being densely filled and will not cause the arc extinguishing medium to loosen. Based on the above design, no matter it is fused or mechanically broken, the broken portion is fully contact with the arc extinguishing medium to ensure the effect of the arc extinguishing and the current breaking.

An arc channel is provided between the fusants 300 on both sides after being broken. The fusant 300 on at least one side and at least a part of the path of the arc channel is in the arc extinguishing medium. That is, it is possible that the fusants 300 on both sides after the breaking and the arc channel between the two are all in the arc extinguishing medium, or it is possible that the fusant 300 on one side is in the arc extinguishing medium while the fusant 300 on the other side is outside the arc extinguishing medium, so that a part of the path of original arc channel is inside the arc extinguishing medium to ensure the arc extinguishing effect.

Optionally, the two sides of the fusant after the breaking are the cathode and the anode, respectively. The cathode or the anode can be moved to the insulating slit 307 between the force applying member and the shell 100 under the drive of the force applying member 301, 302, and 306. In this way, the insulating slit 307 can also improve the arc extinguishing effect.

Optionally, it is designed that no gap or a small gap through which the arc extinguishing medium cannot pass is formed between the force applying member and the fusant 300, and between the guiding member and the fusant 300, so that the force applying member, the guiding member and the fusant 300 form a wall with better blocking effect, which avoids the air conduction under arc pressure, and avoids that the excessive gap causes arc extinguishing medium to flow under arc pressure to affect the blocking effect or affect the compactness of the arc extinguishing medium. And because the resistance to the arc extinguishing medium will not be increased, and the arc extinguishing medium will not be stored due to an excessive gap, the arc extinguishing medium will not be driven to move, this design is easy to achieve high-speed and long-distance movement, which causes the fusant 300 to be separated at a high speed, and the separation distance can be extended to significantly increase the arc extinguishing and breaking capacity.

Optionally, a weak position 308 may be provided on the fusant 300. The material toughness index of the fusant 300 may be tested, and the speed and strength of the force applying members 301, 302, and 306 may be tested. When the driving device 105 works, the force applying members 301, 302, 306 drive the fusant 300 to move in the arc extinguishing medium, so that the fusant 300 is gradually stretched and forms a fracture at the weak position 308, and the fracture can be wrapped by the arc extinguishing medium. It can also guarantee a good arc extinguishing effect.

Figure 4:
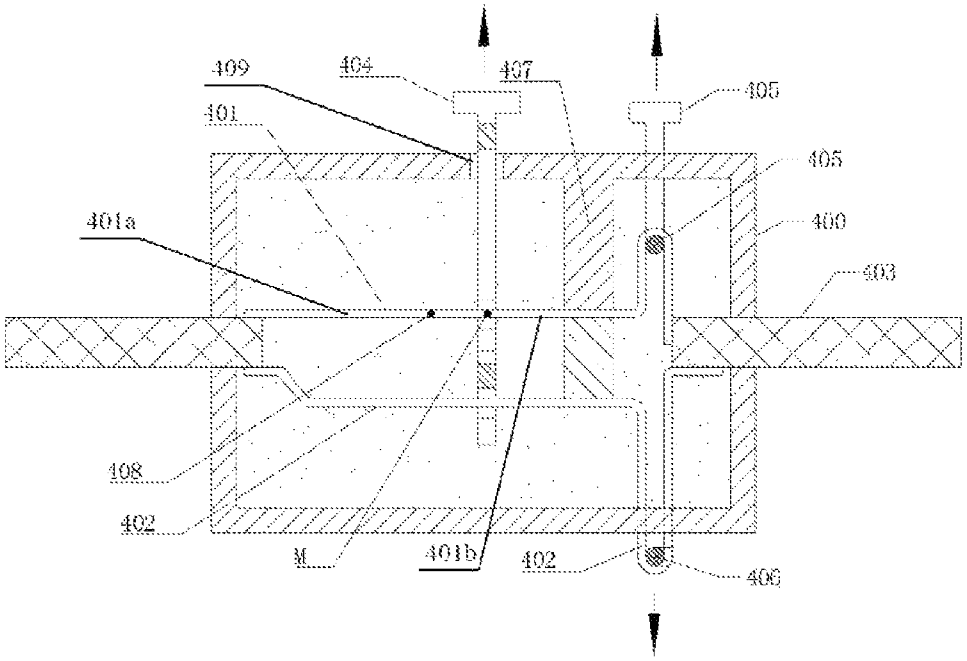
FIG. 4 is a schematic structural diagram of breaking the fusant in a linear displacement manner in which a part of the fusant is located outside the shell.

FIG. 4 shows another structure for breaking the fusant in a linear displacement manner. Two fusants 401 and 402 are arranged in parallel in the shell 400 at intervals, and the two ends of the fusant are respectively connected to conductive terminals 403 penetrating on both sides of the shell 400. The breaking device comprises force applying members 404 and 405 penetrating through the shell 400 and a force applying member 406 located outside the shell 400. One end of the force applying member 404 passes through the shell wall of the shell 400 and is located in the arc extinguishing medium. The grooves for the fusant 401 and the fusant 402 to pass through are formed at one end of the force applying member 404 located in the arc extinguishing medium. The fusant 401 and the fusant 402 pass through the end portion of the force applying member 404 located in the arc extinguishing medium. On one side of the force applying member 405 located at the force applying member 404 and between the force applying member 404 and the force applying member 405 are provided a supporting and fixing device 407 for fixing the fusants 401 and 402, and the fusants 401 and 402 are respectively penetrated and fixed in supporting and fixing device 407.

Please refer to FIG. 4, when the driving device (not shown) is working, the force applying member 404 drives the fusants 401, 402 to move in the arc extinguishing medium, so that the fusants 401, 402 are gradually stretched and at the weak position 408 where the mechanical strength of the fusant is reduced or the position wherein the material tensile stress of the fusant is concentrated, a fracture is formed. The two sides of the fusant after the breaking are the cathode and the anode, respectively. The arc path is between the cathode and the anode, and the cathode and/or the anode are still in the arc extinguishing medium. A part or all of the arc path is in the arc extinguishing medium.

With this structure, after the fusants 401 and 402 are broken, the fusants on both sides can always be wrapped by the arc extinguishing medium, or part of them can be wrapped. For a single-sided fusant, it can also be wrapped by the arc extinguishing medium during the entire movement, or it can be wrapped only within a certain period of time after the breaking. In short, as long as the fracture can be subjected to arc extinguishing normally.

Among them, in order to ensure that the fusant is gradually stretched and a fracture is formed at the weak position 408, the speed and strength of the force applying member 404 can be tested, and the material toughness of the fusants 401 and 402 can be tested to achieve the effect that the fusant 401, 402 is gradually stretched and forms a fracture at the weak position 408, so as to ensure that the fracture can be wrapped by the arc extinguishing medium for a certain initial time/distance, and improve the effect of arc extinguishing and breaking.

In detail, taking the position M where the fusant 401 is close to the force applying member 404 as a reference point, there is a preset distance between the weak position 408 and the shell 400 and/or the reference point.

In more detail, the preset distance is such that the fracture has a distance from the shell 400 and/or the force applying member 404, and at least one of the two ends of the fusant 401 after the breaking can be wrapped by the arc extinguishing medium, and there is no air space larger than the preset range around the fracture.

The preset distance between the weak position 408 and the shell 400 is the first preset distance, and at this time, there is no distance between the weak position 408 and the reference point. Since the fracture is at a certain distance from the shells 400 at both ends, the fusant after the breaking is still in the arc extinguishing medium for a certain period of time after the breaking, and the space for filling the arc extinguishing medium is reserved for the fixed end, so as to make the arc extinguishing medium wrap the broken position, which is conducive to the arc extinguishing. Even if the fusant 401 is fused/vaporized, there is still room for diffusion, and the pressure of the arc at the fracture can be buffered by the arc extinguishing medium to prevent damage to other structures. Of course, it can also be designed such that the fracture is at a distance from the force applying member 404 (that is, there is a preset distance between the weak position 408 and the reference point, called as the second preset distance), and there is no distance from the shell 400. At this time, a part of the fusant 401 after being broken can still be driven by the force applying member 404 to move into the slit 409 between the force applying member 404 and the shell 400 or to the other side of the force applying member 404. During the movement, there is always an arc extinguishing medium to achieve a good arc extinguishing-pressure reducing-high temperature isolating effect.

Alternatively, the fracture has a distance from the shell 400 and also has a distance from the force applying member, that is, both the aforementioned first preset distance and the second preset distance exist. And at least one end of the two ends after the breaking can be wrapped by the arc extinguishing medium. It is more preferable that the two ends after the breaking are separated from the shell 400 and the force applying member 404, and both are also covered by the arc extinguishing medium to achieve better performance.

It should be noted that the first preset distance and the second preset distance are only a different description, and it does not mean that the lengths of the two must be the same or must be different.

In short, as long as the position of the weak position 408 is such that there is a distance between the sections of the two segments after the breaking and the shell 400 or a distance from the force applying member 404, the force applying member can break the fusant at the weak position 408, rather than shearing the fusant.

It is understandable that the fusant 402 and the force applying member 404 can also be arranged in this way.

Among them, the air space of the preset range is an air space of the order of ten micrometers. By limiting the air space to less than tens of micrometers, it is possible to prevent arcs from being generated in the free air of the air space with an excessively large size. Among them, the arc extinguishing medium may be solid particles, and the typical value of the air space formed between the particles is less than 10 micrometers, which is a small restricted space that can avoid arcing.

In the process of pulling up or pressing down on the force applying member 404, the fusant 401 gradually moves and is stretched in the arc extinguishing medium. Due to the weak position 408, the stretch amount is the largest here and is finally broken. After the breaking, the fracture position is directly wrapped by the arc extinguishing medium, so that the section and around the section can be covered by the arc extinguishing medium, and there will be no free air to generate an arc, ensuring that the arc can be fully extinguished after the fusant 401 is broken.

For example, the inside of the shell 400 is protruding with a supporting boss 407, and the two parts after the fusant 401 are broken are the first segment 401*a* and the second segment 401*b* (in the perspective of FIG. 4, the first segment 401*a* is shown on the left side of the weak position 408, the part between the right side and the supporting boss 407 is the second segment 401*b*). The second preset distance enables the second segment 401*b* to continue to move with the force applying member 404, and part of the second segment 401*b* can finally be squeezed into the slit 409 between the force applying member 404 and the supporting boss 407. In this way, the insulation resistance value can be increased, and the arc extinguishing effect can be further improved. It should be noted that the supporting boss 407 is an example of the support structure. The support structure does not have to be boss-shaped, as long as it can form a slit 409 with the force applying member 404 and allow a part of the fusant to enter the arc extinguishing slit 409 after the breaking. The boss may also be a part of the shell 400, that is, there may be a slit 409 between the force applying member and the shell 400 to facilitate the entry of a part of the second segment 401*b*.

For example, the two parts after the fusant 401 are broken are the first segment 401*a* and the second segment 401*b*. The second preset distance enables the second segment 401*b* to continue to move with the force applying member 404, and makes the second segment 401*b* move such that the second segment and the first segment 401*a* is on both sides of the force applying member 404, respectively. The division of the first segment 401*a* and the second segment 401*b* can refer to the above. Since the second segment 401*b* is moved to the right side of the force applying member 404 as a whole, the insulation effect can be further improved, and the effect of breaking the arc is better.

Optionally, the force applying member 404, which is plate-shaped or column-shaped, has the width not less than the width of the fusants 401 and 402 (when the widths of the first segment 401*a* and the second segment 401*b* are inconsistent with each other, it is at least not less than the width of one segment). The force applying member 404 penetrates the shell 400 up and down, and its length is sufficient such that during the process of moving up and down, the part inside the shell 400 always straddles the two opposite side walls of the shell 400 and forms an interference fit with the side walls. After the first segment 401*a* and the second segment 401*b* are respectively located on both sides of the force applying member 404, the force applying member 404 forms an insulating wall between the first segment 401*a* and the second segment 401*b*. The force applying member 404, acting as an insulating wall, achieves further isolation effect, not only insulating the current, but also blocking the high temperature and pressure that may occur of the arc on both sides.

Optionally, as for the above two options for the spacing, the part of the force applying member 404 in contact with the shell 400 or the force applying member 404 itself is made of a gas generating material that generates arc extinguishing gas after the arc burning. Since the arc extinguishing gas is generated and the force applying member 404 is solid, it is difficult to be compressed, thus the generated arc extinguishing gas flows to the space outside the force applying member 404 and squeezes the arc to move it toward the direction of the arc extinguishing medium, which thereby improves the arc extinguishing ability.

The force applying member 405 is located at one end of the arc extinguishing medium and can contact the U-shaped or arc-shaped structure part of the fusant 401. The arc-shaped structure part of the fusant 401 is provided as penetrating the end portion of the force applying member 405. When one end of the force applying member 405 located outside the shell 400 is driven by the driving device to pull the force applying member 405, the portion of the fusant, which is of the arc-shaped structure, is driven to be displaced and the fusant is broken. A weak position 408 is provided on one or both sides of portion of the fusant which is of the arc-shaped structure, or a weak position 408 is provided at the bent portion of the fusant. The arc-shaped structure is more conducive to the force applying member 405 to apply the force to break the fusant. The weak position 408 is provided at the bent portion, which is more helpful to rapidly break the fusant 401.

It can be understood that when the fusant 401 is in cooperation with the force applying member 405, the weak position 408 can also be arranged by referring to the above-mentioned cooperation with the force applying member 404, so that the fusant 401 can be gradually stretched and finally form a fracture at the weak position 408, so as to ensure that the fracture position can be wrapped by the arc extinguishing medium, to achieve a good arc extinguishing effect.

A part of the fusant 402 is in an arc shape, protruding out of the shell 400 to form an arc-shaped structure. The force applying member 406 is a pin shaft structure, which penetrates the arc-shaped structure of the fusant 402. The weak position 408 is provided on the fusant 402 located in the arc extinguishing medium. When the force applying member 406 is driven by the driving device to break the fusant, the fracture formed on the fusant 402 is located in the arc extinguishing medium. A sealing member is provided between the fusant and the shell wall of the shell 400, for performing sealing, so as to prevent the arc extinguishing medium from leakage. The shape of the force applying member 406 located outside the shell 400 may also be similar to the structure of the force applying member 405, but such a structure may result in that a relatively large space outside the shell 400 is occupied by the force applying member 406.

The driving device of the structure in FIG. 4 may be an electric motor, an air cylinder, a hydraulic cylinder, a pneumatic motor, a hydraulic motor, or a transmission device. It is connected with the driving device for performing the driving. The transmission device is, for example, a cam transmission device. The end portion of the force applying member located outside the shell 400 is arranged in a T-shaped structure, and the cam applies externally a driving force to the flat plate at the end portion of the force applying member, and the force applying member can be driven to pull the fusant to break the fusant.

The foregoing FIGS. 1 to 4 are schematic diagrams of several structures in which the breaking device breaks the fusant in a linear displacement manner to form a fracture. It can be seen from the above content that the breaking device may comprise one force applying member or multiple force applying members. According to requirements, a guiding member may be provided or not; when a guiding member is provided, the guiding member may be one or can also be multiple, and there is no need to have a one-to-one correspondence with the force applying member, and it can also be a one-to-many or many-to-one correspondence. Regardless of whether the fusant is wholly or partly located in the arc extinguishing medium, the mechanical fracture of the fusant must be formed in the arc extinguishing medium. A blocking structure to prevent the arc extinguishing medium from leakage is provided between the force applying member, the guiding member and the shell wall. The blocking structure can be a seal structure or an interference fit structure. In addition, the blocking structure can also be provided at the outside of the shell or the inner wall of the shell, such that the arc extinguishing medium is prevented from leakage. For example, a similar cover structure is provided outside the shell on the side where the guiding member is located, and the cover is arranged outside the shell in close contact with the shell. There is enough gap between the cover and the end portion of the guiding member to allow the guiding member to displace, so as to ensure that the guiding member is displaced between the shell walls of the shell and in the gap with the cover. Because the fusant broken process requires a very short time, the shortest breaking time is several milliseconds. In such a short breaking time, the displacement speed of the guiding member is much greater than the leakage speed of the arc extinguishing medium. Therefore, the leaking of the arc extinguishing medium from the shell will not hinder the displacement of the guiding member, and because of the function of the cover, the arc extinguishing medium will not leak to the outside of the cover, and will not cause damage to other components in the circuit.

Figure 5:
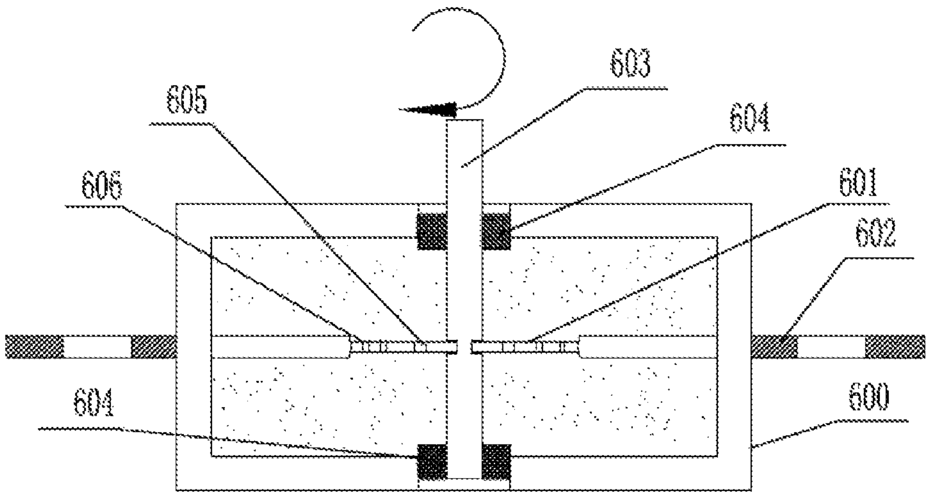
FIG. 5 is a schematic structural diagram of breaking the fusant in a rotational displacement manner.

Next, the structure in which the breaking device breaks the fusant 601 in a rotational displacement manner will be specifically described. Referring to FIG. 5, a fusant 601 is provided in the arc extinguishing medium of the shell 600, and two ends of the fusant 601 are respectively connected to conductive terminals 602 penetrating the shell 600, and the conductive terminals 602 can be connected to an external circuit. The through holes is provided at opposite positions of the shell wall of the shell 600 on both sides at the position where the fusant 601 is broken. The breaking device comprises a rotational force applying member 603, which is a rod-shaped structure; the rotational force applying member 603 passes through the arc extinguishing medium, and both ends of the rotational force applying member respectively penetrate the through holes. One end of the rotational force applying member 603 protrudes out of the shell 600. A blocking structure 604 for preventing the arc extinguishing medium from leakage is provided at the contact surface of the rotational force applying member 603 and the shell wall of the shell 600. It can be understood that a part of the shell 600 can be designed as a rotatable structure, and this part is directly used as the rotational force applying member 603 of the breaking device and is configured with a mounting shaft to realize rotation relative to other parts of the shell 600. When the part rotates, it can be rotated with the installation shaft as an axis, or it can be designed to be able to rotate around an axis with a certain angle relative to the installation shaft, so as to break the fusant 601. In addition, other embodiments using the rotation breaking method can also refer to the solution using the partial shell 600 as the rotational force applying member 603.

Herein, the blocking structure 604 is a sealing structure, and performs sealing by a sealing element, such as a sealing ring. The fusant 601 penetrates the outer periphery of the rotational force applying member 603 and is fixed by the rotational force applying member 603. The fusant 601 is clamped and fixed on the rotational force applying member 603. The driving device (not shown) is located outside the shell 600 and is connected to the rotational force applying member 603 to provide rotation driving force for the rotational force applying member 603. The driving device may be a motor, a gear transmission device, etc., which can provide a rotation driving force for the rotational force applying member 603, and must be a driving device that can be activated by receiving an external excitation electrical signal. The mechanical weak position 605 is arranged on the outer side of the rotational force applying member 603. A fusing weak position 606 is provided on one side of the mechanical weak position 605. Regarding the mechanical weak position 605, as for the rotational breaking manner in any one of the figures, the movement of the fusants 601 on both sides after the breaking in the arc extinguishing medium and the time when it is wrapped by the arc extinguishing medium, etc., can refer to the above-mentioned introduction about straight-line breaking solution, and the corresponding insulation slits can also be designed. In short, as long as it can guarantee a good arc extinguishing effect.

When the fusant 601 is an elongated sheet structure, the rotational force applying member 603 in FIG. 5 can pass through and clamp the fusant 601 from the front surface of the fusant 601 and break the fusant 601 by rotational displacement, or it can clamp the fusant 601 from the side surface of the fusant 601 and break the fusant 601 by rotational displacement.

Figure 6:
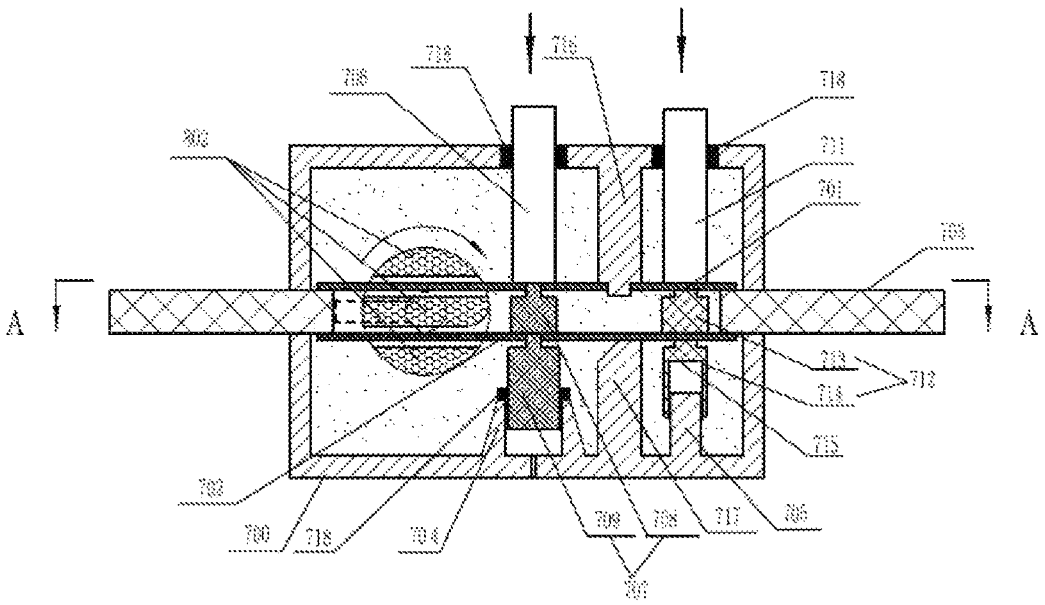
FIG. 6 is a schematic structural diagram of breaking the fusant by combining the rotational displacement manner and the linear displacement manner.
Figure 7:
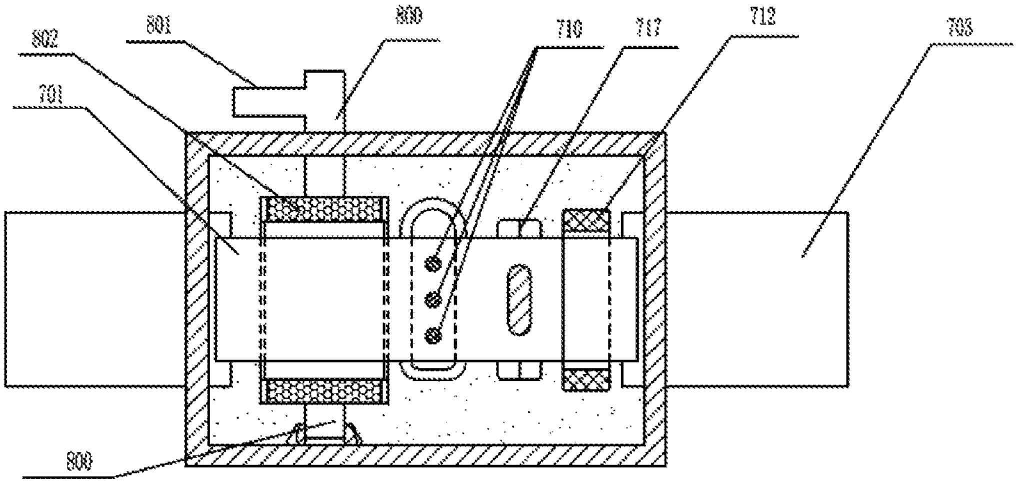
FIG. 7 is a schematic structural diagram of the A-A section in FIG. 6.

FIGS. 6 and 7 are schematic structural diagrams showing that the fusant is broken by combining two manners, wherein multiple sets of breaking devices are respectively in linear displacement manner or rotational displacement manner. The shell 700 is filled with an arc extinguishing medium, and two parallel fusants 701 and 702 are arranged in parallel and spaced apart in the arc extinguishing medium. The two ends of the two fusants 701 and 702 are respectively connected to the conductive terminals 703 penetrating the shell 700, and the conductive terminals 703 can be connected to an external circuit. In this example, the fusants 701 and 702 are of elongated sheet structure. Two through holes

108 are formed spaced apart on the shell 700 above the front surface of the fusants 701 and 702, and a boss 704 and a guide post 705 are respectively provided on the shell wall of the shell 700, at other side, opposite to the two through holes 108. The boss 704 is provided with a hole that does not penetrate the shell wall. A set of force applying member 706 and guiding member 707 are respectively provided at the positions of the two fusants 701 and 702 corresponding to the two through holes 108. Herein, one end of the force applying member 706 passes through the through hole 108 on the shell wall and protrudes out of the shell 700, and the other end is located on the fusant 701. The guiding member 707 comprises a guiding member sub-part 708 and a guiding member sub-part 709, which are composed of two sub-parts that are joint with each other. Herein, the guiding member sub-part 708 is located between the two fusants 701 and 702, one end of which is provided with three connecting posts 710 spaced apart, the connecting posts 710 pass through the fusant 701 and are fixedly connected to the fusant 701, and the other end is located on the fusant 702. The end of the guiding member sub-part 709 connected with the guiding member sub-part 708 is also provided with three connecting posts 710 at intervals. The three connecting posts on the guiding member sub-part 709 pass through the fusant 702 and are fixedly connected to an end of the guiding member sub-part 708 located at the fusant 702, so as to form the entire guiding member 707. The fusants 701 and 702 are fixed on the guiding member 707. The other end of the guiding member 707 is inserted into the hole in the boss 704, and a gap sufficient for the guiding member 707 to be displaced is reserved between the guiding member 707 and the bottom of the hole. The blocking devices 718 for preventing the arc extinguishing medium from leakage are provided at the contact surfaces of the force applying member 706 and the guiding member 707 with the shell 700. Among them, sealing members are used for sealing. The sealing member at the guiding member 707 is arranged on the limiting boss, and the limiting boss is snapped on the boss 704 of the shell wall. The force applying member 706 and the guiding member 707 form a breaking device.

Another set of breaking device also comprises a force applying member 711 and a guiding member 712. One end of the force applying member 711 extends out of the shell 700 through the through hole 108, and the other end is located on the fusant 701. The guiding member 712 comprises a guiding member sub-part 713 and a guiding member sub-part 714. The guiding member sub-part 713 is located between the fusant 701 and the fusant 702, one end of which is fixedly connected to the fusant 701, and the other end is located on the fusant 702. A number of connecting posts are arranged at intervals on the upper end of the guiding member sub-part 714, and the connecting posts pass through the fusant 702 and are fixedly connected to the guiding member sub-part 713, thereby forming a complete guiding member 712, such that the fusant 701 and the fusant 702 are fixed on the guiding member 712. A slot 715 is formed at the position corresponding to the guide post 705 at the other end of the guiding member 712; the slot 715 on the guiding member 712 is clamped on the outer periphery of the guide post 705. There is a gap, for the guiding member 712 to move, between the end surface of the guide post 705 and the bottom of the slot 715. There is enough distance between the end surface of the guiding member 712 where the slot 715 is provided and the shell wall of the shell 700 where the guide post 705 is provided, for the guide post 705 to displace along the guide post 705. A blocking device 718 for preventing leakage of the arc extinguishing medium is provided at the contact surface of the force applying member 711 and the shell wall, wherein the blocking device is a sealing member. The sealing can also be achieved by interference fit, or by a mechanical blocking structure provided in the shell 700 or outside the shell 700.

A supporting arm 716 and a supporting boss 717 for supporting and fixing the two fusants 701 and 702 are arranged between the two sets of breaking devices. The fusant 701 passes through the supporting arm 716 and is fixedly supported, and the fusant 702 is located on the supporting boss 717 and is fixedly supported.

Driven by the driving device (not shown), in the above-mentioned two breaking devices, the force applying member drives the guiding member and drives the fusant to displace, thereby breaking the fusant and forming a mechanically broken fracture.

On one side of the two breaking devices that break the fusant in a linear displacement manner, a breaking device that breaks the fusant in a rotational displacement manner is also provided. The breaking device comprises a rotating shaft 800, one end of the rotating shaft 800 protrudes from one side wall of the shell 700, and a rotating handle 801 is provided at the end portion of the rotating shaft 800 located outside the shell 700. One end of the rotating shaft 800 located in the shell 700 passes between the two fusants 701 and 702 and is rotatably arranged on the inner wall of the shell 700. The part of the rotating shaft 800 located between the two fusants 701 and 702 is set as a block structure that is attached to one sides of the two fusants 701 and 702, and the other sides of the two fusants 701 and 702 are respectively provided with a pressure block. The pressure block is partially fixedly connected with the block structure located between the two fusants 701 and 702, thereby forming a clamping assembly 802 on the rotating shaft 800, which clamps and fixes the two fusants on the rotating shaft 800.

The driving device acts on the rotating handle 801 or directly on the rotating shaft 800 to drive the rotating shaft 800 to rotate, so as to break the two fusants 701 and 702. Since the rotating shaft 800 penetrates through the shell walls on the sides of the two fusants 701 and 702 and is clamped on both sides of the fusant, thus the breaking effect thereof is better than that in FIG. 5, resulting in the larger fracture. When the driving device drives the rotating handle 801 to drive the rotating shaft 800 to rotate, the driving device can be a linear driving device. At this time, the rotating handle 801 is arranged to be inclined, and the driving device moves from a high point to a low point to press the rotating handle 801 to drive the rotating shaft 800 to rotate. When the driving device acts on the rotating shaft 800, the driving device needs to directly provide the rotating shaft 800 with rotational force at this time. At this time, the driving device may be gears, belts, chains and other transmission devices.

In the present disclosure, when the fusant is broken in a linear displacement manner, after the breaking device breaks the fusant to form a fracture, with the continuous displacement of the breaking device, it is possible to bring the broken part of the fusant away from the arc extinguishing medium, so as to enter the through hole provided on the shell wall or enter the displacement space provided on the shell wall. A small part of the arc generated at the fracture may enter the through hole or displacement space with the breaking device. In this case, most of the arc generated at the fracture is extinguished by the arc extinguishing medium, and a small part of the arc is extinguished by the slit formed by the piston and the shell.

The above-mentioned embodiment emphatically describes the structural example of mechanically breaking the fusant in the case where the arc extinguishing medium is filled in the shell. Among them, there are few descriptions of fusing of the fusant. No matter what kind of mechanical manner is used to break the fusant structure, the essential feature of the fusant is fusing. When the fault current is sufficient to cause the fusant fused, it will inevitably form a fusing fracture. Therefore, there is not much space to explain it here. For example, when the fault current is small or the fault current is zero, the fault current is not enough to fuse the fusant. At this time, the fusant in the arc extinguishing medium only has a mechanical breaking fracture. When the fault current is large, the fusing fracture can be generated before or after the mechanical fracture is generated; when the fault circuit is very large, the fusant is fused first and the fusing fracture occurs. After the fusant fusing fracture is generated, it is necessary to determine whether a mechanical breaking fracture needs to be formed according to the size of the breaking voltage, the size of the fuse, etc., which can be achieved by setting the conditions of transmitting the excitation signal in the external control device. In all the above structures, the end portions of the force applying member and the guiding member in contact with the fusant are made of insulating materials.

In all the structures of the present disclosure, before and after the action of the breaking device, the arc extinguishing medium must be located in the shell and cannot leak, otherwise, the leaked arc extinguishing medium will affect the performance of equipment, units, vehicles, and the like that use the fuse.

Regardless of the above-mentioned structure for breaking the fusant in a linear displacement manner or in a rotational displacement manner, the driving device can receive an external excitation signal to act. The driving device may be an electric motor, an air cylinder, a hydraulic cylinder, a pneumatic motor, a hydraulic motor, a transmission device, or other driving devices that can act according to an external excitation signal.

The working principle of the fuse of the present disclosure is as follows.

The working principle of breaking the fusant in a linear displacement manner is the same as that of breaking the fusant in a rotational displacement manner. Therefore, the breaking device for breaking the fusant in the linear displacement manner in FIG. 1 is taken as an example for description.

When the fault current is small or the fault current is zero but the fusant 102 needs to be broken according to the set conditions, the fault current is not enough to fuse the fusant 102; the driving device 105 receives the excitation signal from the outside and drives the combination formed by the force applying member 200, the guiding member 201 and the part of the fusant 102 between them to displace downward together to break the fusant 102 from the weak position 204 and form a fracture in the arc extinguishing medium 101, and the arc is extinguished in the arc extinguishing medium 101, the fusant 102 is broken by mechanical breaking manner, thereby realizing circuit protection;

When the fault current is large, the large current is enough to fuse the fusant 102. At this time, a high temperature is generated at the fusing weak position 205 of the fusant 102, and the fusant 102 is fused; while the fusant 102 is fused, the driving device 105 receives an external excitation signal from the outside and drives the combination formed by the force applying member 200, the guiding member 201 and the part of the fusant 102 between them to displace downward together, and the fusant 102 is broken from the weak position 204, ensuring that the fusant 102 is broken. Since there is a certain current range for a larger fault current, the time required for the fusant 102 to be fused is different within this current range. Therefore, the mechanically breaking fracture may be formed before or after the fusing fracture is formed.

When the fault current is large, the fusant 102 will be fused first to form a fusing fracture, and the circuit can be broken only by the fusing of the fusant 102; the external excitation signal may not be sent to the driving device 105, and the breaking device will not operate.

When no fault current is generated, an excitation signal can also be sent to the driving device 105 according to the set conditions to make the driving device 105 drive the breaking device to break the fusant 102 and break the circuit.

In summary, the fuse of the present disclosure can be individually broken mechanically as required, can also be individually broken by fusing the fusant, or can be broken by a combination of mechanical breaking and fusant fusing as required, which improves the current breaking range and breaking capacity of the fuse; at the same time, because the generated arc is extinguished in the arc extinguishing medium, and the fusant is mechanically broken to form a fracture, and then the arc distance is elongated with the displacement of the breaking device, arc extinguishing is easier, and the arc extinguishing ability is improved. In addition, when the force applying member and the guiding member are displaced, a blocking structure is arranged between the force applying member and the guiding member and the shell wall, which avoids the arc extinguishing medium from leakage and improves the operation safety of the fuse.

The above descriptions are only preferred embodiments of the present disclosure and are not intended to limit the present disclosure. For those skilled in the art, the present disclosure may have various modifications and changes. Any modification, equivalent replacement, improvement, etc. made within the spirit and principle of the present disclosure shall be comprised in the protection scope of the present disclosure.

INDUSTRIAL APPLICABILITY

The fuse of the present disclosure can realize circuit protection by breaking the fusant by fusing individually, breaking mechanically, or a combination of the two, thereby widening the breaking current range, breaking the fuse in the full current range, and improving the breaking capacity and breaking reliability of the fuse; the fusant fracture is set in a sealed profiled cavity filled with arc extinguishing medium, which improves the arc extinguishing effect, prevents the arc from leakage, and improves the operation safety of the fuse; at the same time, the fusant is mechanically broken to shorten the breaking time; and the fuse of the present disclosure has a simple structure and a small volume.

What is claimed is:

1. A fuse in form of breaking a fusant by fusing breaking and mechanical breaking, comprising a hollow shell; an arc extinguishing medium, which is filled in the hollow shell; at least one piece of the fusant, which is arranged in the hollow shell; and conductive terminals, which are provided as penetrating through a shell wall of the hollow shell, with the conductive terminals capable to be connected to an external circuit, wherein two ends of the fusant are respectively connected with the conductive terminals, wherein at least one breaking device that mechanically breaks the fusant is provided in the hollow shell; a driving device arranged outside the hollow shell, after receiving an external excitation signal, drives the at least one breaking device to break the fusant in one of a linear displacement mode, a rotational displacement mode, or a combination of both modes, so that the fusant forms at least one fracture in the arc extinguishing medium; blocking structures for preventing the arc extinguishing medium from leakage are arranged between the at least one breaking device and the hollow shell wall of the hollow shell; and the fusant which is located in the arc extinguishing medium is provided with at least one weak position where a mechanical breaking strength of the fusant is reduced and a fusing is easy to be achieved.

2. The fuse in form of breaking the fusant by said fusing breaking and mechanical breaking according to claim 1, wherein the at least one breaking device for breaking the fusant is in the linear displacement mode, and wherein the at least one breaking device comprises at least one force applying member and at least one guiding member respectively arranged on both sides of the fusant; one end of the at least one force applying member penetrates out of the hollow shell wall; one end of the at least one guiding member is provided as penetrating the hollow shell wall, wherein when the one end of the at least one guiding member is located in the hollow shell wall, a gap is formed between the one end of the at least one guiding member and the hollow shell wall, allowing for displacement of the at least one guiding member; the blocking structures for preventing the arc extinguishing medium from leakage are provided between the at least one force applying member, the at least one guiding member and the hollow shell wall; and the driving device drives the at least one force applying member and the at least one guiding member to displace, so as to break the fusant to form a fracture.

3. The fuse in form of breaking the fusant by said fusing breaking and mechanical breaking according to claim 2, wherein the arc extinguishing medium is of arc extinguishing solid particles, arc extinguishing liquid, or arc extinguishing colloid with or without particles, wherein the at least one force applying member and the at least one guiding member, in combination, clamp the fusant, and no gap or a tiny gap exists between the at least one force applying member and the fusant and between the at least one guiding member and the fusant, with the tiny gap not allowing the arc extinguishing medium to pass therethrough, wherein when the at least one force applying member drives the fusant to move, sum of volume of a part of the at least one force applying member and volume of a part of the at least one guiding member, inside the hollow shell, does not change significantly.

4. The fuse in form of breaking the fusant by said fusing breaking and mechanical breaking according to claim 2, wherein at least one set of a force applying member of the at least one force applying member and a guiding member of the at least one guiding member are provided on both sides of the fusant; and one ends of the force applying member and/or the guiding member located on both sides of the fusant are fixedly connected to the fusant and clamp the fusant.

5. The fuse in form of breaking the fusant by said fusing breaking and mechanical breaking according to claim 2, wherein when the at least one guiding member is provided as penetrating in a through hole on the hollow shell wall, a displacement distance limiting structure is provided in a direction in which the at least one guiding member is displaced and moves forward.

6. The fuse in form of breaking the fusant by said fusing breaking and mechanical breaking according to claim 2, wherein the at least one breaking device for breaking the fusant operates in the rotational displacement mode and is further provided in a shell on one side of the at least one breaking device that breaks the fusant in the linear displacement mode; the at least one breaking device for breaking the fusant in the rotational displacement mode comprises a rotational force applying member which is rotatably penetratingly installed on the hollow shell, and the rotational force applying member is partly located outside the hollow shell and partly located in the arc extinguishing medium; the fusant penetrates and is fixed on the rotational force applying member located in the arc extinguishing medium; the blocking structures for preventing the arc extinguishing medium from leakage is arranged between the rotational force applying member and the hollow shell wall of the hollow shell; and the driving device drives the rotational force applying member to break the fusant in the rotational displacement mode to form a fracture.

7. The fuse in form of breaking the fusant by said fusing breaking and mechanical breaking according to claim 1, wherein when the driving device is working, the at least one force applying member drives the fusant to move in the arc extinguishing medium, so that the fusant is gradually stretched and formed with the at least one fracture at the at least one weak position, and an arc channel is formed between fusants on both sides after breaking, and fusant on at least one side and at least a part of a path of the arc channel are in the arc extinguishing medium.

8. The fuse in form of breaking the fusant by said fusing breaking and mechanical breaking according to claim 7, wherein said both sides of the fusant after breaking are a cathode and an anode, respectively, and the cathode or the anode is able to be driven by the at least one force applying member to move into an insulating slit between the at least one force applying member and the shellthe hollow shell.

9. The fuse in form of breaking the fusant by said fusing breaking and mechanical breaking according to claim 1, wherein the at least one breaking device for breaking the fusant operates in the linear displacement mode and comprises at least one set of force applying members, wherein the force applying members have one ends extending out of the hollow shell and the other ends located on one or both sides of the fusant in the arc extinguishing medium; the blocking structures for preventing the arc extinguishing medium from leakage are arranged between the force applying members and the hollow shell wall of the hollow shell; and the driving device drives the force applying members to pull or push the fusant to make it broken, forming a fracture, wherein when the driving device is working, the force applying members drive the fusant to move in the arc extinguishing medium, so that the fusant is stretched and the fracture is formed at a position of the fusant where a mechanical strength is weak or at a position of the fusant where a material tensile stress is concentrated, and after breaking, both sides of the fusant are a cathode and an anode, respective, an arc path is formed between the cathode and the anode, the cathode and/or the anode are still in the arc extinguishing medium, and part or all of the arc path is in the arc extinguishing medium.

10. The fuse in form of breaking the fusant by said fusing breaking and mechanical breaking according to claim 9, wherein with a position of the fusant close to the force applying members as a reference point, a preset distance is provided between the at least one weak position and the hollow shell, and/or between the at least one weak position and the reference point; and due to the preset distance, a distance is formed between the fracture and the hollow shell and/or the force applying members, and the fusant is broken to form two ends, with at least one of the two ends capable of being wrapped by the arc extinguishing medium, and no air space larger than a preset range exists around the fracture.

11. The fuse in form of breaking the fusant by said fusing breaking and mechanical breaking according to claim 10, wherein the preset distance exists between the at least one weak position and the reference point; and the fusant after being broken forms two parts which are a first segment and a second segment, respectively, and a part of the second segment is able to be finally squeezed into a slit between the force applying members and a supporting structure in the hollow shell.

12. The fuse in form of breaking the fusant by said fusing breaking and mechanical breaking according to claim 11, wherein a part of the force applying members that is in contact with the hollow shell or the force applying members themselves are made of a gas generating material which generates arc extinguishing gas after arc burning.

13. The fuse in form of breaking the fusant by said fusing breaking and mechanical breaking according to claim 10, wherein the preset distance exists between the at least one weak position and the reference point; and the fusant after being broken forms two parts which are a first segment and a second segment, respectively, and the second segment is able to be moved such that the second segment and the first segment are located on both sides of the force applying members, respectively.

14. The fuse in form of breaking the fusant by said fusing breaking and mechanical breaking according to claim 13, wherein a width of the force applying members is not less than a sectional width of the first segment or a sectional width of the second segment after breaking; and after the first segment and the second segment are respectively located on both sides of the force applying members, the force applying members form an insulation wall between the first segment and the second segment.

15. The fuse in form of breaking the fusant by said fusing breaking and mechanical breaking according to claim 1, wherein a breaking device for breaking the fusant in the linear displacement mode comprises at least one set of force applying members; the force applying members are located outside the hollow shell, and a part of the fusant located in the hollow shell is wound to extend out of the hollow shell to form a U-shaped or an arc-shaped structure outside of the hollow shell; the force applying members are provided as penetrating in the arc-shaped structure; a blocking structure for preventing the arc extinguishing medium from leakage is provided between the fusant and the hollow shell wall of the hollow shell; and the driving device drives the force applying members to break the fusant to form a fracture, and the fracture is located in the arc extinguishing medium.

16. The fuse in form of breaking the fusant by said fusing breaking and mechanical breaking according to claim 1, wherein the at least one breaking device for breaking the fusant in the rotational displacement mode and comprises a rotational force applying member which is rotatably penetratingly installed on the hollow shell, or a partial structure of the hollow shell is able to rotate and serve as a rotational force applying member of the breaking device; the rotational force applying member is partly located outside the hollow shell and partly located in the arc extinguishing medium; the fusant partially or completely penetrates and is fixed on the rotational force applying member located in the arc extinguishing medium; a blocking structure for preventing the arc extinguishing medium from leakage is provided between the rotational force applying member and the hollow shell wall of the hollow shell; and a driving device drives the rotational force applying member to break the fusant in the rotational displacement mode to form a fracture.

17. The fuse in form of breaking the fusant by said fusing breaking and mechanical breaking according to claim 16, wherein one end of the rotational force applying member located in the arc extinguishing medium, which is in shape of a clip, clamps the fusant.

18. The fuse in form of breaking the fusant by said fusing breaking and mechanical breaking according to claim 1, wherein the driving device is a gas generating device that is able to generate pressurized gas, a fluid generating device that generates pressurized fluid, electric motor, air cylinder, hydraulic cylinder, pneumatic motor, hydraulic motor, or transmission device.

19. The fuse in form of breaking the fusant by said fusing breaking and mechanical breaking according to claim 1, wherein a supporting and fixing device for supporting and fixing the fusant is provided in the hollow shell.

20. A power distribution unit or equipment, energy storage equipment, or electrical equipment, using at least one of the fuse according to claim 1.

* * * * *